Patented June 17, 1941

2,246,321

UNITED STATES PATENT OFFICE 2,246,321

RESINS AND PROCESS FOR THEIR PREPARATION

Raphael Rosen, Elizabeth, N. J., assignor to Standard Oil Development Company, a corporation of Delaware No Drawing. Application January 6, 1939, Serial No. 249,603

4 Claims. (Cl. 260—30)

This invention relates to improved resins and processes for preparing the same, and, more particularly, to the preparation of a sulfur-containing resin which is readily soluble in vehicles used in surface coating compositions, particularly in the relatively cheap hydrocarbon vehicles such as petroleum naphthas, and also in drying oils.

This application is a continuation-in-part of application Serial No. 113,105 filed November 28, 1936.

It has now been found that improved resins are prepared by condensing phenol poly-sulfides, particularly alkyl phenol disulfides, having alkyl groups of more than two carbon atoms, with the lower, water-soluble aldehydes such as paraldehyde, formaldehyde and formalin.

These resins are transparent and almost colorless in thin layers and are characterized by a light orange color in massive form. They have relatively high softening points of the order of 50 to 100° C. and higher. They are soluble in petroleum naphthas and other hydrocarbon solvents, drying oils, and vegetable oils generally, and indeed in all common organic solvents.

Preferred resins are obtained when using dialkyl diphenol disulfides having from about four to about six carbon atoms in the alkyl groups, such as butyl phenol disulfide, $(C_4H_9.C_6H_3.OH)_2S_2$ and amyl phenol disulfide, $(C_5H_{11}.C_6H_3.OH)_2S_2$. The alkyl groups may be straight (normal-), or branched (iso-), and the compounds having secondary or tertiary alkyl groups are preferred. The reaction is preferably conducted in an aqueous alkaline medium, of which aqueous ammonia is one example.

The preparation of such resins is illustrated in the following examples:

Example 1

50 grams of di-tertiary amyl di-phenol disulfide are mixed with 10 grams of 37% aqueous formaldehyde and 5 cc. of concentrated aqueous ammonia. The mixture is heated to boiling with agitation under reflux for 2 hours and is then allowed to cool. A resin precipitates out during the heating operation and settles and solidifies on cooling. The water is decanted and there is thus obtained as the crude reaction product a resin having a light orange color and having a softening point (ball and ring method) of 76° C. This resin is transparent in layers, ¼" or more in thickness, and is very clear and almost colorless in thin layers or films. It is slightly sticky to the touch.

Example 2

50 grams of di-tertiary amyl-di-phenol disulfide are mixed with 12 grams of 37% aqueous formaldehyde and 5 cc. of concentrated aqueous ammonia. The mixture is heated to boiling with agitation under reflux for 3½ hours, and is then allowed to cool and the water is decanted. There is thus obtained as the crude reaction product a resin having a softening point of 99° C. This resin is very hard, is not sticky to the touch, and is slightly darker than the resin obtained in Example 1.

The resins obtained in both examples are completely soluble in hydrocarbon solvents, such as naphtha, benzene, and liquid petroleum fractions generally. They are also soluble in the drying oils and in vegetable oils generally and in ordinary organic solvents including ethyl alcohol, ether, acetone, butyl acetate, 2-methoxy-ethanol, 2-butoxy-ethanol and the like. For example, they are soluble to the extent of 25% or more in linseed oil. They are also compatible with nitrocellulose, both in solution in mutual solvents and in the dry film, in concentrations up to 20% and higher.

The resin is characterized by high stability to heat and resistance to aging. It is suitable for use in a great variety of surface coating compositions, particularly in paints and varnishes, together with suitable drying oils. With ordinary linseed oil, the addition of the resin may slow down the drying rate. It is, therefore, preferably used in combination with drying accelerators, such as cobalt and lead naphthenates.

The resin is compatible with cellulose acetate from 0 to 50% of resin, giving transparent films of good flexibility. It may also be used to plasticize sulfur. These resins are also suitable for use in wood impregnation both with volatile solvents and with heavy involatile wood-impregnating oils. It is also suitable for compounding with rubber, rubber substitutes, asbestos, and with various other fillers.

This invention is not to be limited to any specific examples or explanations, all of which are presented herein solely for purpose of illustration.

I claim:

1. A composition of matter consisting of a solution in a liquid petroleum oil fraction of a stable resin resulting from the condensation of a compound having the formula $$(R-C_6H_3-OH)_2S_2,$$

where R is an alkyl radical having 4 to 6 carbon atoms, with formaldehyde in the presence of ammonia.

2. A composition of matter according to claim 1 where R is a butyl radical.

3. A composition of matter according to claim 1 where R is an amyl radical.

4. A composition of matter according to claim 1 where R is a tertiary amyl radical.

RAPHAEL ROSEN.